United States Patent [19]
United States Patent [19]
Van Gils

[11] 3,857,726
[45] Dec. 31, 1974

[54] ADHESIVE DIP FOR BONDING RUBBER TO BRIGHT STEEL WIRE

[75] Inventor: Gerard E. Van Gils, Tallmadge, Ohio

[73] Assignee: The General Tire & Rubber Company, Akron, Ohio

[22] Filed: July 5, 1973

[21] Appl. No.: 376,510

[52] U.S. Cl............ 117/49, 117/75, 117/128.4, 117/128.7, 148/6.15 R, 156/315, 156/335
[51] Int. Cl...................... B32b 15/02, B32b 15/06
[58] Field of Search......... 117/128.7, 128.4, 49, 75, 117/76 T; 156/335, 315; 148/6.15 R

[56] References Cited
UNITED STATES PATENTS

| | | |
|---|---|---|
| 3,405,754 | 10/1968 | Georges et al............... 117/128.4 X |
| 3,586,568 | 6/1971 | Campbell.......................... 117/49 X |
| 3,660,202 | 5/1972 | Edington et al..................... 156/315 |
| 3,677,809 | 7/1972 | Klement............................ 117/75 X |
| 3,728,192 | 4/1973 | Kindle et al. .................. 156/335 X |
| 3,798,051 | 3/1974 | Morita.................................. 117/75 |

*Primary Examiner*—Ralph Husack

[57] ABSTRACT

Rubber compounds are readily bonded to bright steel or bright alloy steel reinforcing elements, particularly tire cords, using a dip system consisting essentially of an alkaline aqueous dispersion containing a mixture of a rubbery vinyl pyridine copolymer and a heat reactable 2,6-bis(2,4-dihydroxy phenylmethyl)-4-chlorophenol composition. Improved adhesion between the wire and the rubber is obtained with this dip system.

6 Claims, No Drawings

ADHESIVE DIP FOR BONDING RUBBER TO BRIGHT STEEL WIRE

BACKGROUND OF THE DISCLOSURE

1. Field of the Invention

This invention pertains to the field of adhesives. More particularly, this invention concerns adhesives for bonding elastomers to iron-containing metals.

There are many products that require rubber bonded to metal such as electrical components like rubber isolators, pry bars, switch gear; industrial products like bridge bearings, dock bumpers, and hangers; and automobile parts like bushings, engine mounts, shock absorbers, and foot pedals. In this latter group, and of growing importance are steel-cord reinforced pneumatic tires.

Bonding rubber to different substrates involves a variety of factors such as the polarity between the respective substrates, the composition of the metal, the presence of lubricants, the difficulties encountered with foreign matter at the interface, to name just a few. Specifically with respect to steel and steel alloys and further with respect to steel cord used in reinforced rubber tires, bonding the rubber to the steel has posed extremely difficult problems. Not only is the surface of steel somewhat incompatible with many adhesives and many rubber compounds, but steel has a tendency to corrode in the presence of water-containing adhesives and rubbers so that both initial and long-term bonding has to be conducted under nearly anhydrous conditions.

2. Description of the Prior Art

Presently, there are two useful methods of bonding rubber to steel; one is to plate the steel surface with brass for direct contact to the rubber, and the other is by the use of a non-aqueous, i.e., organic solvent-based adhesive on the steel prior to pressing the rubber into contact therewith. These practices develop acceptable bonding but involve a variety of disadvantages. Brass plating is extremely expensive, tends to fail in areas of curvature in the steel, and is very sensitive to the composition of the rubber. The organic solvents in the adhesives produce a toxic environment and the risk of fire. Further, the bond between rubber and brass-plated steel and between rubber and conventional adhesive coated steel deteriorate with time. This occurs when the adhesive coated steel and the rubber coated steel are exposed to air. Adhesive coated steel which is exposed to the atmosphere before being bonded to rubber will have a weaker bond than adhesive-coated steel which isn't first exposed to the atmosphere. The adhesion problems have become serious enough that compounders are severely restricted in their selection of rubber compounds. There appears in the art, therefore, a real need for a better adhesive for bonding rubber to metal, especially to "bright" steel, i.e., steel with no brass plating.

Adhesives have been prepared from various polymers such as epoxy modified butadiene-styrene latices (U.S. Pat. Nos. 3,316,195 and 3,312,754), epoxy modified styrene-acrylic acid latices (U.S. Pat. No. 2,784,128), carboxylated polybutyl acrylates (U.S. Pat. No. 3,465,058), and styrene-butadiene-itaconic acid latices (U.S. Pat. No. 3,165,434). However, these have been found to give very poor bonding between rubber and bright steel and/or rapidly deteriorate in bond strength upon exposure of the adhesive-coated steel or the rubber-adhesive-steel laminate to air. In addition, others have used various combinations of styrene, butadiene, carboxylic acids, and epoxy compounds for adhesive uses, such as are disclosed in U.S. Pat. Nos. 2,944,044; 3,131,158; 3,150,112; 3,312,754; 3,386,939; and 3,399,080. However, none of these adhesives or other uses of the polymers has satisfied the problem of bonding rubber to bright steel.

SUMMARY OF THE INVENTION

Accordingly, it is an object of the present invention to provide a method for bonding bright steel and bright alloy steel wire to a rubber compound.

More specifically, it is an object of the present invention to provide an aqueous, non-toxic, one-dip adhesive system and method for applying the same to improve the adhesion between bright steel wire and a rubber compound and which increases the latitude of the rubber compounder in the selection of the rubber.

It is a further object of the present invention to provide a dip system for bonding bright steel wire to rubber which has better stability in the presence of moisture.

It is a related object of the present invention to provide a dip system and method for bonding bright melt spun steel wire to a rubber compound which will result in acceptable adhesion.

These and other objects of the present invention, which will become apparent upon a reading of the following detailed description, are accomplished by the provision of a method for adhering bright steel or bright alloy steel reinforcing elements to a rubber compound. The method comprises:

a. dipping said element in a dip consisting essentially of an aqueous alkaline dispersion containing a mixture of a rubbery vinyl pyridine copolymer and a heat reactable 2,6-bis(2,4-dihydroxy phenylmethyl)-4-chlorophenol composition;

b. curing said dipped element;

c. combining said dipped and cured element with a vulcanizable rubber compound; and d. vulcanizing the same.

DESCRIPTION OF THE PREFERRED EMBODIMENT

The composition and method of this invention are useful for bonding bright steel and bright alloy steel to natural rubber and synthetic replacements therefor. By "steel" is meant a malleable alloy of iron and carbon, usually containing substantial quantities of manganese. By "alloy steel" is meant steel that owes its distinctive properties chiefly to some element or elements other than carbon or jointly to such other elements and carbon; some of the alloy steels necessarily contain an important percentage of carbon, even as much as 1.25%. It should be noted, however, that there is no agreement as to where the line between alloy steels and steel is customarily drawn.

The term "natural rubber" means rubber obtained from botanical sources, primarily from the hevea brasiliensis tree; and also from other trees such as ficus elastica; from shrubs, such as parthenium-argentatum; and vines such as landolphia. By the term "synthetic replacements" is meant synthetic replacements for natural rubber such as polyisoprene, polybutadiene, emulsion polymerized styrene-butadiene copolymers, solution polymerized styrene-butadiene copolymers, and styrene-butadiene rubbers made be the "Alfin" process which is a polymerization catalyzed chiefly by a mixture of allyl-sodium, sodium isopropoxide, and sodium chloride. Of course, mixtures of any of these above-stated materials would also qualify as "synthetic replacements" for natural rubber.

A number of steels and alloy steels are in a variety of rubber containing products such as tire belts, tire beads, drive belts, and bushings. By "bright" is meant, as aforesaid, that the steel is not brass plated but may be treated to prevent or at least reduce corrosion such as by phosphatizing, chromic acid soaking, or nitrate treatment, etc., where required. That is, some steels are highly corrosion resistant without extra treatment; in these cases no treatment is needed. In addition, these bright steels and alloy steels are generally sandblasted and pickled in acids to remove traces of foreign matter. Sprecific among the alloy steels usable with the curable adhesive composition of this invention is the type known as E4130 which is an electric furnace steel containing carbon, manganese, chrome, and molybdenum as alloying agents. It is one of the types that does not require a corrosion resistant treatment. The steel or alloy steel may be used in a variety of sizes and shapes such as plates, billets, bar stock, formed products, cords and braided steel wire, and other configurations. Particularly important, however, are steel wires and cords useful as reinforcement in the carcass of pneumatic tires. Among these tire cord steels is the type known as "Bekaert" steel tire cord made by the Bekaert Steel Corporation and having the following composition:

| carbon | 0.701 % |
| manganese | 0.490 % |
| sulfur | 0.020 % |
| phosphorus | 0.018 % |
| silicon | 0.280 % |
| copper | 0.021 % |
| chromium | 0.010 % |
| nitrogen | 0.005 % |
| iron | 98.455 % |

While the adhesive-containing bright steel reinforcing elements of this invention can be adhered to a vulcanizable blend of natural rubber, polybutadiene rubber, and rubbery butadiene-styrene copolymer by curing the same in combination together, it is apparent that said adhesive-containing bright steel reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight of 1,3-butadiene, 7 to 22% by weight styrene and 7 to 22% by weight of vinyl pyridine. Excellent results are obtained using a latex of a terpolymer of about 70% of 1,3-butadiene, 15% of a styrene and 15% of vinyl pyridine, by weight, having a total solids content of around 30 to 50 percent. Further disclosures of rubbery vinyl pyridine copolymer latices may be found in U.S. Pats. Nos. 2,615,826 and 3,437,122.

The heat reactable 2,6-bis(2,4-dihydroxy phenylmethyl)-4-chlorophenol composition used in the dip of the present invention is made by the process of first reacting about 2 mols of formaldehyde with 1 mol of para-chlorophenol to provide 2,6-dimethylol-4-chlorophenol which then is reacted with about 2 mols of resorcinol to give the heat reactable bis(dihydroxy phenylmethyl)chlorophenol composition. The final product may be treated to remove unused starting materials and by-products although this is not usually necessary. However, the product as produced is substantially heat reactable 2,6-bis(2,4-dihydroxy phenylmethyl)-4-chlorophenol composition having an average molecular weight of up to about 800 and a melting point of up to about 240°C. It is preferably used as made without subsequent expensive purification steps. It is added to or mixed with the latex of the rubbery vinyl pyridine copolymer in the form of a solution 5–30% solids in water containing $NH_3$ sufficient to render the solution alkaline, usually about 0.5 to 7.5%. More information on how to prepare the heat reactable 2,6 -bis(2.4-dihydroxy phenylmethyl)-4-chlorophenol composition is shown by Mather, "Development of a Polyester-Rubber Adhesive," British Polymer Journal, Volume 3, March, 1971, pages 58 to 62 and U.S. Pat. No. 3,660,202. The chlorophenolic composition is heat reactable so that it can react with itself, the rubber and possibly also the cord.

Water is used in an amount sufficient to provide for the desired dispersion of the rubber or latex particles, for the solution of the heat reactable chlorophenolic composition and for the proper solids content to get the necessary pick-up of solids on and penetration between the fibers of the steel cord.

The dip thus consists essentially of an aqueous dispersion of the rubbery vinyl pyridine copolymer latex and the heat reactable chlorophenolic composition, the copolymer and chlorophenolic composition being present in a total amount (as dry solids, dispersed or dissolved in the water) of from about 10 to 30% by weight. The ratio (dry) of the copolymer to the chlorophenolic composition in the dip is from about 100:10 to 100:75 parts by weight, preferably from about 100:35 to 100:55 parts by weight. Sufficient alkaline material is present from the chlorophenolic solution to render the dip alkaline or additional alkaline material such as $NH_4OH$ can be added to achieve this purpose, to prevent premature coagulation of the rubbery copolymer and to solubilize the chlorophenolic compound.

The method of bonding bright steel or bright alloy steel to natural rubber, or synthetic replacements therefor, using the curable adhesive composition of this invention generally comprises the following steps: first, making or preparing the above-described latex composition, then feeding the steel through the adhesive dip bath containing the rubber and the chlorophenol. The time the steel remains in the dip is about a second, or in the case of steel cords, at least for a period of time sufficient to allow wetting of the cord and penetration of the cord, among the filaments and strands, by the adhesive dip. It is then necessary to heat treat the coating of adhesive by either air drying or heating in an oven at elevated temperatures, such as from about 300°F. to about 500°F., for from about 30 to about 150 seconds. This heat treatment removes the water and heat-sets the solids from the dip, depositing thereon an amount of the solids equal to about 0.5% of the weight of the wire. Finally, the adhesivecoated steel wire is embedded in the curable rubber compound to form a partially bonded article. Full bond strength is not, of course, achieved until the curable rubber encasing the steel is cured. With respect to the encasing of the steel wires in the rubber, it is normally accomplished by passing the wires through the nip of a calender that contains a roll or reservoir of curable, milled rubber so that the output from the mill is a thin sheet of curable rubber containing the adhesive-coated steel wires in parallel alignment enclosed therein.

On certain types of steel surfaces it is necessary to pretreat the surface before beginning the above-described dipping process, in order to prevent corrosion. The pretreatment generally involves dipping the surface in a solution containing an oxidizing (or phosphatizing) agent which causes the formation of a thin layer of oxide (or phosphate) on the surface, thus apparently making it resistant to further corrosion. When practicing the present invention for the first time on a different type of wire or steel surface, it is a matter of experimentation to determine whether or not is is necessary to dip the steel in a pretreatment dip.

The following examples will serve to illustrate the invention with more particularity to those skilled in the art. However, they should not be construed either singly or in combination, as limiting the invention, which is properly delineated in the appended claims.

EXAMPLE I

This example was performed with bright steel alloy wire (style 004) supplied by Bekaert Steel (construction 5 × 7 × 0.0059 inch).* First, an adhesive dip system was prepared which is an aqueous dispersion of:

a. 100 parts of a latex of a rubbery terpolymer of 70% by weight 1,3-butadiene, 15% by weight of styrene, and 15% by weight of 2-vinyl pyridine (41% by weight solids);

b. 100 parts of an aqueous solution containing about 4 normal ammonia and dissolved therein, about 20% by weight of 2,6-bis(2,4-dihydroxy phenylmethyl)-4-cholorphenol (e.g., the reaction product of $H_2Co$, resorcinol and p-chlorophenol); and c. 100 parts of water.

*This is tire cord terminology and means that the cord is made of 5 bundles (strands), each containing 7 wires (filaments), wherein all of the wires are 0.0059 inches nominal diameter. See Rubber Age, May, 1971, page 59.

The cord was cut into 16, 12 inch segments and each segment dipped into the adhesive after having been cleaned of adhering dust and other foreign matter. (In actual factory use, of course, the cord would be dipped, then cut after lamination into the rubber compound). The dipped segments were then shaken to remove the excess and dried for two minutes in a hot air oven (300°F. at entrance, 342°F. at exit). One portion (½ inch long) of each of the 16 segments of adhesive coated wire was then sandwiched (perpendicularly) between strips of a standard rubber stock of the following formulation:

| Ingredient | Parts (by weight) |
|---|---|
| MV—102 (natural rubber) | 46.64 |
| SBR—1500 | 38.5 |
| Polybutadiene | 15.0 |
| FEF Black | 45.0 |
| HiSil (PPG) | 15.0 |
| BLE 25 (antioxidant from Uniroyal) | 2.0 |
| Processing oil | 5.0 |
| Zinc oxide | 3.0 |
| Stearic acid | 1.5 |
| Cohedur RL (Bayer) | 4.7 |
| Santocure NS (Monsanto) | 1.2 |
| Sulfur | 3.0 |
| | 180.54 |

The strips form a pad 9-½ inches long, ½ inch wide and ½ inch high. Thereafter, the pad with the wires embedded therein was cured in an oven at 315°F. for 30 minutes, then reinforced with a pair of steel strips 9-½ inches long and nine-sixteenth inch high, placed on the outside of the pad lying in planes parallel to the plane of the wires. The top grip of the testing machine is a special holder in which the cured pad can be inserted with the wires protruding vertically through a slot in the bottom of the holder. The bottom grip is a wedge which clamps onto the wires. Each of the 16 cord segments is then pulled out of the rubber pad and the average of the 16 pulls (in pounds) is the "pull-out adhesion."

Brass coated wire of the same construction was then embedded into the same stock and tested in the above-described manner the test results were as follows:

| Wire | Pull-out Adhesion (⅜ inch embedment at room temperature about 25°C.) |
|---|---|
| Brass-plated | 180 lbs. |
| Bright steel wire dipped according to invention | 202 lbs. |

EXAMPLE II

Melt spun wire supplied by Monsanto (construction 7 × 3 × 0.004 inch) required a pretreatment with either an oxidizing or phosphatizing solution. After pretreatment the cords were dipped in the adhesive dip system of Example I and dried in an oven for two minutes at 320°F. The cords were then cured into the rubber compound of Example I and tested for H-adhesion in accordance with ASTM D-2138, with a ⅜ inch embedment in the rubber, giving the following results:

| Sample | H-Adhesion |
|---|---|
| A | 63 lbs. |
| B | 63 lbs. |
| C | 64 lbs. |

For comparison, a brass coated cord of approximately the same outside gauge, cured into a similar rubber stock, was tested for adhesion also with a ⅜ inch embedment and the average was 45 lbs.

Notes:
A. Pretreated with a 1% aqueous solution of monosodium phosphate ($NaH_2PO_2$) at 80°C. for 60 seconds, then dipped.
B. Pretreated with a 1% aqueous solution of phosphoric acid plus 0.1% Aerosol OT at 80°C. for 60 seconds, then dipped.
C. Pretreated with a 1% aqueous solution of chromic acid plus 0.1% Aerosol OT at room temperature for 30 seconds, then dipped.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. A method for adhering a bright steel or bright alloy steel reinforcing element to a rubber compound which comprises:
   a. dipping said element in a dip consisting essentially of an aqueous alkaline dispersion containing a mixture of a rubbery vinyl pyridine copolymer and a heat reactable 2,6-bis(2,4-dihydroxy phenylmethyl)-4-chlorophenol composition;
   b. curing said dipped element;
   c. combining said dipped and cured element with a vulcanizable rubber compound; and
   d. vulcanizing the resultant product.

2. The reinforcing element-rubber composite produced by the method of claim 1.

3. The method of claim 1 including the preliminary step of pretreating said element with an aqueous solution containing a minor amount of a material selected from an oxidizing agent and a phosphatizing agent.

4. A method for adhering a bright steel or bright alloy steel reinforcing element to a rubber compound which comprises treating said element with an adhesive composition consisting essentially of an aqueous alkaline dispersion of from about 10 to 30% by weight as dry solids of a mixture of a rubbery vinyl pyridine copolymer and a heat reactable 2,6-bis(2,4-dihydroxy phenylmethyl)-4-chlorophenol composition, the parts by weight ratio of said copolymer to said chlorophenolic composition being from about 100:10 to 100:75, heat treating said element to remove the water and to heat-set the solids from said adhesive composition and to deposit on said element from said adhesive composition a total of about 0.5% by weight solids based on the weight of said element, said heat treatment being conducted at temperatures of from about 300° to about 500°F. for from about 30 to about 150 seconds; cooling said treated element, combining said cooled treated element with an unvulcanized vulcanizable rubber compound, and vulcanizing the resultant product.

5. A method according to claim 4 where said rubbery vinyl pyridine copolymer is a copolymer of from about 60 to 80% by weight of butadiene-1,3, from 7 to 22% by weight of styrene, and from 7 to 22% by weight of 2-vinyl pyridine, and where said chlorophenolic composition has an average molecular weight of up to about 800 and a melting point of up to about 240°C.

6. The reinforcing element-rubber composite produced by the method of claim 4.

* * * * *